JOHN T. DEE & I. MURRAY.
Andiron.
No. 126,273.
Patented April 30, 1872.
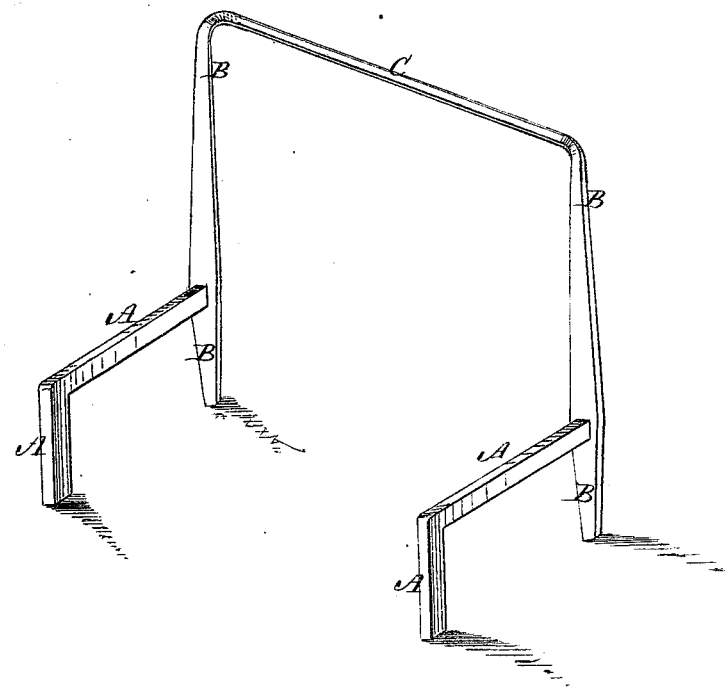
Witnesses:
Inventor:
J. T. Dee
I. Murray
Per
Attorneys.

UNITED STATES PATENT OFFICE.

JOHN T. DEE AND ISAAC MURRAY, OF FREDERICKTOWN, MISSOURI.

IMPROVEMENT IN ANDIRONS.

Specification forming part of Letters Patent No. 126,273, dated April 30, 1872.

Specification describing a new and useful Improvement in Andirons, invented by JOHN T. DEE and ISAAC MURRAY, of Fredericktown, in the county of Madison and State of Missouri.

The figure is a perspective view of our improved andirons.

Our invention has for its object to improve the construction of andirons or fire-dogs so as to make them simpler in construction, more convenient in use, and less liable to fall over or get out of place; and it consists in the andirons constructed as hereinafter more fully described.

A are the horizontal bars of the andirons, the forward ends of which are bent downward to form the forward feet. The rear ends of the bars A are attached to the vertical bars B, the lower ends of which serve as feet for the andirons. The upper ends of the bars B are connected by a horizontal bar, C, or rather formed in one piece with said bar C. This construction enables the andirons to be made with only four feet instead of six, as they must have when made separate.

With this construction it is much more convenient to take up ashes and perform other necessary operations in taking care of the fire. The andirons are also much less liable to get out of place or tip over, and are consequently a much less annoyance than the old andirons.

Having thus described our invention, we claim as new, and desire to secure by Letters Patent—

The andirons A B C, constructed substantially as herein shown and described—that is to say, with the upper ends of the vertical bars connected by a horizontal bar, and with their lower ends extending down vertically to form the outer feet, as and for the purposes set forth.

JOHN T. DEE.
ISAAC MURRAY.

Witnesses:
THOMAS HOLLADAY,
N. B. ALLEN.